(No Model.)
J. NASE.
LAWN RAKE.
No. 492,167. Patented Feb. 21, 1893.
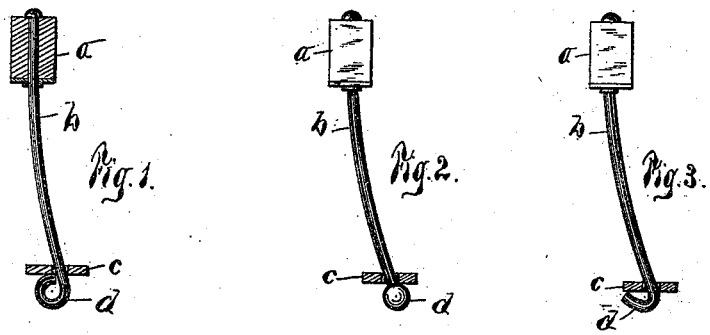
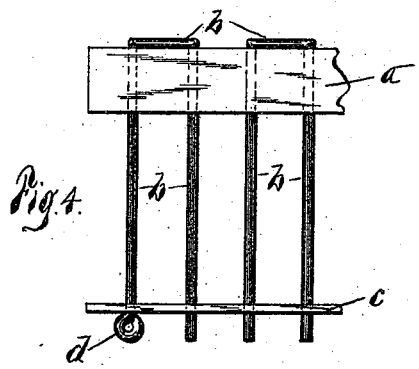
WITNESSES:
J. J. Laass
C. L. Bendixon
INVENTOR:
John Nase
By Dull, Laass & Dull
his ATTORNEYS.
THE NORRIS PETERS CO., PHOTO-LITHO., WASHINGTON, D. C.

UNITED STATES PATENT OFFICE.

JOHN NASE, OF SYRACUSE, NEW YORK, ASSIGNOR TO THE SYRACUSE SPECIALTY MANUFACTURING COMPANY, OF SAME PLACE.

LAWN-RAKE.

SPECIFICATION forming part of Letters Patent No. 492,167, dated February 21, 1893.

Application filed October 22, 1892. Serial No. 449,625. (No model.)

*To all whom it may concern:*

Be it known that I, JOHN NASE, of Syracuse, in the county of Onondaga, in the State of New York, have invented new and useful Improvements in Lawn-Rakes, of which the following, taken in connection with the accompanying drawings, is a full, clear, and exact description.

This invention relates to the class of rakes which are provided with metallic teeth and with a cleaning bar sliding vertically on said teeth.

The invention consists in a novel construction of the teeth whereby they are prevented from entering into the ground, and the said cleaning-bar is retained thereon without the employment of the usual extra attachment of devices for supporting said bar.

In the annexed drawings Figures 1, 2 and 3 are end views of rake-heads provided with teeth embodying my invention, and Fig. 4 is a front view of a section of a rake embodying a modification of my invention.

Similar letters of reference indicate corresponding parts.

$a$— represents the rake head which may be of either wood or metal and of any suitable or desired shape.

$b$—$b$— denote the teeth which are composed of metal, preferably of stout wire, and —$c$— represents the cleaning bar which is adapted to slide vertically on the teeth and is designed to remove therefrom any substance that may lodge thereon in the process of raking. To retain the said bar on the teeth by simple and inexpensive means I provide two or more of said teeth, preferably the two end-teeth, with suitable feet —$d$— on their lower ends. Said feet being larger than the eyes of the bar —$c$— through which the teeth pass, and thus forming barriers which prevent said bar from sliding off from the ends of the teeth. The foot may be formed in various ways either by bending the end of the tooth into the shape of a loop or ring standing in a plane at right angles to the head —$a$— as shown in Fig. 1 of the drawings, or in a plane parallel with said head as shown in Fig. 4 of the drawings, or the foot —$d$— may be formed by bending the end of the tooth rearward and upward as represented in Fig. 3 of the drawings, or by upsetting the end of the tooth into the shape of a head or ball as shown in Fig. 2 of the drawings, or in any other suitable manner which will form a barrier to the slipping of the bar —$c$— from the end of the tooth, but in either case I prefer to form the foot —$d$— integral with the tooth. Aside from the aforesaid function of the feet —$d$—$d$— they also serve as guards or runners which prevent the rake from running into the ground in the operation of raking.

Having described my invention, what I claim as new, and desire to secure by Letters Patent, is—

A rake-head provided with a cleaning bar and with barriers formed on the lower ends of the teeth to support the cleaning bar in its normal position, as set forth.

In testimony whereof I have hereunto signed my name this 19th day of October, 1892.

JOHN NASE. [L. S.]

Witnesses:
   H. M. SEAMANS,
   J. J. LAASS.